United States Patent
Cooney et al.

(10) Patent No.: US 12,504,718 B2
(45) Date of Patent: Dec. 23, 2025

(54) DRIVER FOR A DISPLAY DEVICE

(71) Applicant: Envisics Ltd, Milton Keynes (GB)

(72) Inventors: Rory Cooney, Milton Keynes (GB); Ian Bledowski, Milton Keynes (GB); Antariksh Saxena, Milton Keynes (GB)

(73) Assignee: Envisics Ltd., Milton Keynes (GB)

( * ) Notice: Subject to any disclaimer, the term of this patent is extended or adjusted under 35 U.S.C. 154(b) by 0 days.

(21) Appl. No.: 18/585,519

(22) Filed: Feb. 23, 2024

(65) Prior Publication Data
US 2024/0319671 A1    Sep. 26, 2024

(30) Foreign Application Priority Data

Mar. 20, 2023  (GB) ..................................... 2304008

(51) Int. Cl.
*G03H 1/22* (2006.01)
*G09G 3/00* (2006.01)

(52) U.S. Cl.
CPC ......... *G03H 1/2294* (2013.01); *G03H 1/2202* (2013.01); *G09G 3/003* (2013.01); *G03H 2001/2231* (2013.01); *G03H 2225/32* (2013.01); *G03H 2225/52* (2013.01); *G03H 2250/38* (2013.01)

(58) Field of Classification Search
None
See application file for complete search history.

(56) References Cited

U.S. PATENT DOCUMENTS

| 2009/0284671 A1 | 11/2009 | Leister |
| 2011/0122467 A1* | 5/2011 | Futterer ................... G03H 1/02 359/9 |
| 2021/0149341 A1 | 5/2021 | Bledowski et al. |

FOREIGN PATENT DOCUMENTS

CN          111819490 A      10/2020

OTHER PUBLICATIONS

Combined Search and Examination Report issued on Oct. 10, 2023 in GB 2304008.2 (5 pages).
Examination Opinion issued on Aug. 12, 2025 in Taiwan App. 11420850590 (8 pages).
English translation of Examination Opinion issued on Aug. 12, 2025 in Taiwan App. 11420850590 (8 pages).

* cited by examiner

*Primary Examiner* — Christopher J Kohlman
(74) *Attorney, Agent, or Firm* — Akerman LLP

(57) ABSTRACT

There is provided a driver for a spatial light modulator comprising a plurality of pixels. The driver is configured to receive a hologram of a picture and drive the spatial light modulator to display the hologram on a group of pixels of the plurality of pixels. The driver is further configured to apply a series of phase offsets to the spatial light modulator displaying the hologram, wherein each phase offset of the series of phase offsets is applied to each pixel of the group of pixels for a respective predetermined period of time.

17 Claims, 8 Drawing Sheets

DRIVER FOR A DISPLAY DEVICE

CROSS-REFERENCE TO RELATED APPLICATIONS

This application claims priority under 35 U.S.C. § 119 to UK Patent Application GB 2304008.2 titled "Driver for a Display Device," filed on Mar. 20, 2023, and currently pending. The entire contents of GB 2304008.2 are incorporated by reference herein for all purposes.

FIELD

The present disclosure relates to a driver for a display device such as a spatial light modulator. More specifically, the present disclosure relates to a driver for driving a spatial light modulator to display a hologram and a changing phase offset. Even more specifically, the present disclosure relates to a driver which drives the spatial light modulator in a way which prolongs the performance characteristics of the spatial light modulator. Some embodiments relate to a holographic projector, picture generating unit or head-up display.

INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

Broadly, there is provided a driver for a spatial light modulator. The driver is arranged to drive the spatial light modulator to display a hologram. The driver is further arranged to apply a changing phase offset to each pixel of the spatial light modulator such that the same phase offset is applied to each pixel at any given time. The inventors have found that the application of such a changing phase offset advantageously preserves the performance characteristics of the spatial light modulator even over very prolonged/extended use of the spatial light modulator and does so in a way that does not adversely affect the quality of a holographic reconstruction formed from light that has been spatially modulated in accordance with the hologram displayed on the spatial light modulator. For example, the inventors have advantageously found that the application of a changing phase offset may reduce the tendency of "sticking" of individual pixels of the spatial light modulator (e.g. the tendency of a liquid crystal to adopt a particular state such that the liquid crystal remains in that state even after a drive voltage is removed).

It is known that the performance of many display devices may become degraded after being driven in an imbalanced way for prolonged periods of time. One advantage of displaying a sequence of holograms (rather than real images, as in most conventional displays) on a spatial light modulator is that doing so generally results in even use of the grey levels of the spatial light modulator such that, broadly speaking, imbalances are averaged out. This is because the grey level of each individual pixel during dynamic holographic projection of a video sequence of images can be shown to essentially resemble white noise. However, after thorough simulation and experimentation, the inventors have identified that there are some factors which can contribute to spatial modulator being driven in an imbalanced way even when the displayed pattern is a hologram rather than an image. One factor is that static errors or errors in a flatness of the spatial light modulator (for example, arising from tolerances in the manufacture process of the spatial the light modulator) can result in imbalances when the spatial light modulator is being driven. Another factor is that, although a sequence of holograms may generally average out to white noise, there are cases where artefacts in the hologram calculation result in the long term average of the sequence of holograms displayed on the spatial light modulator tending towards certain grey levels such that the long term average is not truly random. Such artefacts could include, for example, a phase ramp function displayed on the hologram pixels and/or a lens such as a Fresnel lens.

In more conventional displays comprising liquid crystal cells, field inversion is used to balance the drive voltage applied. It is commonplace to repeatedly reverse the polarity of the voltage applied to the liquid crystal cell. For example, the voltage between the common electrode and the pixel electrode may be positive in a first frame and negative in a second frame. The equal but opposite electric field in the two frames results in the same grey level but ensures that the molecules of the liquid crystal cell are DC balanced (i.e. driven in a balanced way). However, because the grey level is the same in both frames, field inversion does not address the problem of certain grey levels being statistically favoured in the long term. This may not be a concern in conventional liquid crystal cells because such cells are very robust and have a relatively low intrinsic susceptibility to imbalances in the driving voltage. Thus, field inversion is typically considered enough to balance driving of the cell to maintain its performance characteristics over an expected lifetime of the cell. However, spatial light modulators (such as liquid crystal on silicon spatial light modulators) typically comprise materials that are much more sensitive to imbalances in the driving voltage than conventional liquid crystal cells. So, it is preferable that imbalances in the driving of the spatial light modulator are minimised as much as possible to maximise the period over which the performance characteristics of the spatial light modulator are preserved (without sticking).

The inventors have found that the application of a changing phase offset to all pixels of spatial light modulator significantly reduce the tendency of the spatial light modulator towards specific grey levels. By regularly changing the phase offset, a randomisation of the grey levels that pixels of the spatial light modulator are driven into is significantly increased. Thus, the risk of "sticking" is reduced and the performance characteristics of the spatial light modulator is maintained over a prolonged period of time. The inventors have recognised that, by applying the same phase offset to each hologram pixel, a holographic reconstruction formed by light that is spatially modulated in accordance with the hologram may not be affected by the phase offset. This is because it is the difference in phase between adjacent pixels of the spatial light modulator that is important in the formation of the holographic reconstruction. By applying the same phase offset to each pixel (simultaneously), the phase difference between (adjacent) pixels is maintained. An analogous approach could not be applied to conventional displays (which comprise pixels encoded with a real image rather than a hologram, for example).

In an aspect, a driver for a spatial light modulator comprising a plurality of pixels is provided. The driver is configured to receive a hologram of a picture, drive the spatial light modulator to display the hologram on a group of pixels of the plurality of pixels, and apply a series of phase offsets to the spatial light modulator displaying the hologram. The group of pixels may be a contiguous group of pixels. The group of pixels may comprise at least some, optionally all, of the plurality of pixels of the spatial light modulator. Each phase offset of the series of phase offsets is applied to each pixel of the group of pixels for a respective predetermined period of time. In other words, each phase offset is applied to each of the pixels used to display the hologram. A particular phase offset (of the series of phase offsets) is applied to each pixel of the group of pixels substantially simultaneously at a first time. A different phase offset (of the series of phase offsets) is applied to each pixel of the group pixel substantially simultaneously at a second time.

For example, the driver may be arranged to display the hologram on [x x y] pixels of the spatial light modulator. Said [x x y] pixels of the spatial light modulator may, therefore form said group of pixels. As the driver is arranged to apply the phase offset to each pixel of the group of pixels on which the hologram is displayed, the driver may be further arranged to apply the phase offset to each pixel of the [x x y] pixels of the spatial light modulator. The driver may be arranged such that the same first value of phase offset is applied to each pixel of the [x x y] pixels at a first time. Subsequently, the driver may be arranged to apply the same second value of phase offset to each pixel of the [x x y] pixels of the spatial light modulator such that the same second value of phase offset is applied to each pixel of the [x x y] pixels at a second time.

The series of phase offsets may comprise positive or negative values.

The driver may be arranged to repeatedly update the phase offset such that a different value of phase offset is applied to each pixel of the [x x y] pixels of the spatial light modulator after each update. The same phase offset may be applied to each pixel of the [x x y] pixels between updates. The phase offset being applied to one of the pixels may cause a phase delay of that pixel to be modified.

Each phase offset applied to the group of pixels may cause the phase delays of that group of pixels to be modified by a same value. The driver may be further configured to determine, for each pixel of the group of pixels, a respective voltage offset to be applied to achieve a particular phase offset of the series of phase offsets. The voltage offsets may comprise different values or values that are the same as each other. The driver may be further configured to apply the series of phase offsets by applying the determined voltage offsets to the group of pixels. The respective predetermined periods of time may be the same or different from each other. Each application of the phase offsets may be temporally separated from each other by a respective time interval. The time intervals may be the same or different from each other.

In some embodiments, the series of phase offsets comprises a finite series of (discrete) values. The finite series of (discrete) values may comprise at least a first value of phase offset and a second value of phase offset that is different to the first value of phase offset. The finite series of (discrete) value may comprise at least five, optionally at least 10 different (discrete) values of phase offset. The finite series of (discrete) values of phase offset may be stored in a memory of the driver. The driver may be arranged to apply different phase offsets from the finite series of (discrete) to each pixel of the group of pixels (that also display the hologram) at different times and such that the same phase offset is applied to each pixel for any given time. The driver may be arranged to cycle through the finite series of phase offsets. The driver may be arranged to cycle through the finite series of phase offsets sequentially. The driver may be arranged such that the finite series of (discrete) values is repeated. For example, once the driver has applied each of the finites series of (discrete) values in turn a first time, the driver may be arranged to apply a first value of the series a second time.

In some embodiments, the series of phase offsets comprises an infinite series of values or a finite series of values. In such embodiments, the infinite series of values may not repeat. The series of phase offsets may comprise randomly generated values or algorithmically generated values. The driver may be arranged to randomly or algorithmically generate the values of the (infinite) series.

Each phase offset may be between 0 and $2\pi$, preferably between 0 and $\pi$, more preferably between 0 and $\pi/2$. The difference between successive phase offset values may be less than $2\pi$, preferably less than $\pi$, more preferably less than $\pi/2$, more preferably less than $\pi/4$. The spatial light modulator may be a liquid crystal on silicon spatial light modulator.

The driver may be arranged to apply the phase offset to substantially all of the pixels of the spatial light modulator.

In another aspect, there is provided a driver for a spatial light modulator comprising a plurality of pixels. The driver is arranged to receive a hologram of a picture and to drive the spatial light modulator to display the hologram on [x x y] pixels of the spatial light modulator. The driver is further arranged to apply a phase offset to each of the [x x y] pixels of the spatial light modulator such that the same first value of phase offset is applied to each of the [x x y] pixels at a first time. The driver is further arranged to apply the same second value of phase offset to each of the [x x y] pixels of the spatial light modulator such that the same second value of phase offset is applied to each of the [x x y] pixels at a second time. The second value of phase offset is different to the first value of phase offset.

In some embodiments, the driver is arranged to repeatedly update the phase offset such that a different value of phase offset is applied to each of the [x x y] pixels of the spatial light modulator after each update. The same phase offset may be applied to each of the [x x y] pixels between updates.

In yet another aspect, a holographic projector is provided. The holographic projector comprises the driver as described above, and a spatial light modulator configured to be driven by the driver. The holographic projector may comprise a light source arranged to illuminate the spatial light modulator such that a holographic reconstruction of the picture can be viewed on a replay plane.

The spatial light modulator may comprise one or more liquid crystal cells. For example, the spatial light modulator may be a liquid crystal on silicon spatial light modulator.

In yet another aspect, a method for driving a spatial light modulator comprising a plurality of pixels is provided. The method comprises receiving a hologram of a picture, driving the spatial light modulator to display the hologram on a group of pixels of the plurality of pixels, and applying a series of phase offsets to the spatial light modulator displaying the hologram. Each phase offset of the series of phase offsets is applied to each pixel of the group of pixels for a respective predetermined period of time. The group of pixels may be a contiguous group of pixels. Each phase offset applied to the group of pixels may cause the phase delays of that group of pixels to be modified by a same value.

The method may comprise determining, for each of the group of pixels, a respective voltage offset to be applied to achieve a particular phase offset of the series of phase offsets. The series of phase offsets may be applied by applying the determined voltage offsets to the group of pixels.

The series of phase offsets may comprise a finite series of values that is repeated. Each phase offset may be between 0 and $2\pi$, preferably between 0 and $\pi$, more preferably between 0 and $\pi/2$. The difference between successive phase offsets may be less than $2\pi$, preferably less than $\pi$, more preferably less than $\pi/2$. The successive phase offsets may be values of the series of phase offsets that are of sequentially implemented members of the series of phase offsets.

Some examples use an optical device, such as a waveguide or pupil expander, to replicate a holographic wavefront formed by the spatial light modulator. In the present disclosure, the term "replica" is merely used to reflect that spatially modulated light is divided such that a complex light field is directed along a plurality of different optical paths. The word "replica" is used to refer to each occurrence or instance of the complex light field after a replication event—such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. It may therefore be said that a plurality of replicas of the hologram are formed. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length, such that the complex light field has evolved differently along each path. That is, two complex light fields are still considered "replicas" in accordance with this disclosure even if they are associated with different propagation distances—providing they have arisen from the same replication event or series of replication events.

A "diffracted light field" or "diffractive light field" in accordance with this disclosure is a light field formed by diffraction. A diffracted light field may be formed by illuminating a corresponding diffractive pattern. In accordance with this disclosure, an example of a diffractive pattern is a hologram and an example of a diffracted light field is a holographic light field or a light field forming a holographic reconstruction of an image. The holographic light field forms a (holographic) reconstruction of an image on a replay plane. The holographic light field that propagates from the hologram to the replay plane may be said to comprise light encoded with the hologram or light in the hologram domain. A diffracted light field is characterized by a diffraction angle determined by the smallest feature size of the diffractive structure and the wavelength of the light (of the diffracted light field). In accordance with this disclosure, it may also be said that a "diffracted light field" is a light field that forms a reconstruction on a plane spatially separated from the corresponding diffractive structure. An optical system is disclosed herein for propagating a diffracted light field from a diffractive structure to a viewer. The diffracted light field may form an image.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

FIG. 7 shows a method for reducing image burn-in.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

In the present disclosure, the term "substantially" when applied to a structural units of an apparatus may be interpreted as the technical feature of the structural units being produced within the technical tolerance of the method used to manufacture it.

Conventional Optical Configuration for Holographic Projection

Figure 1:
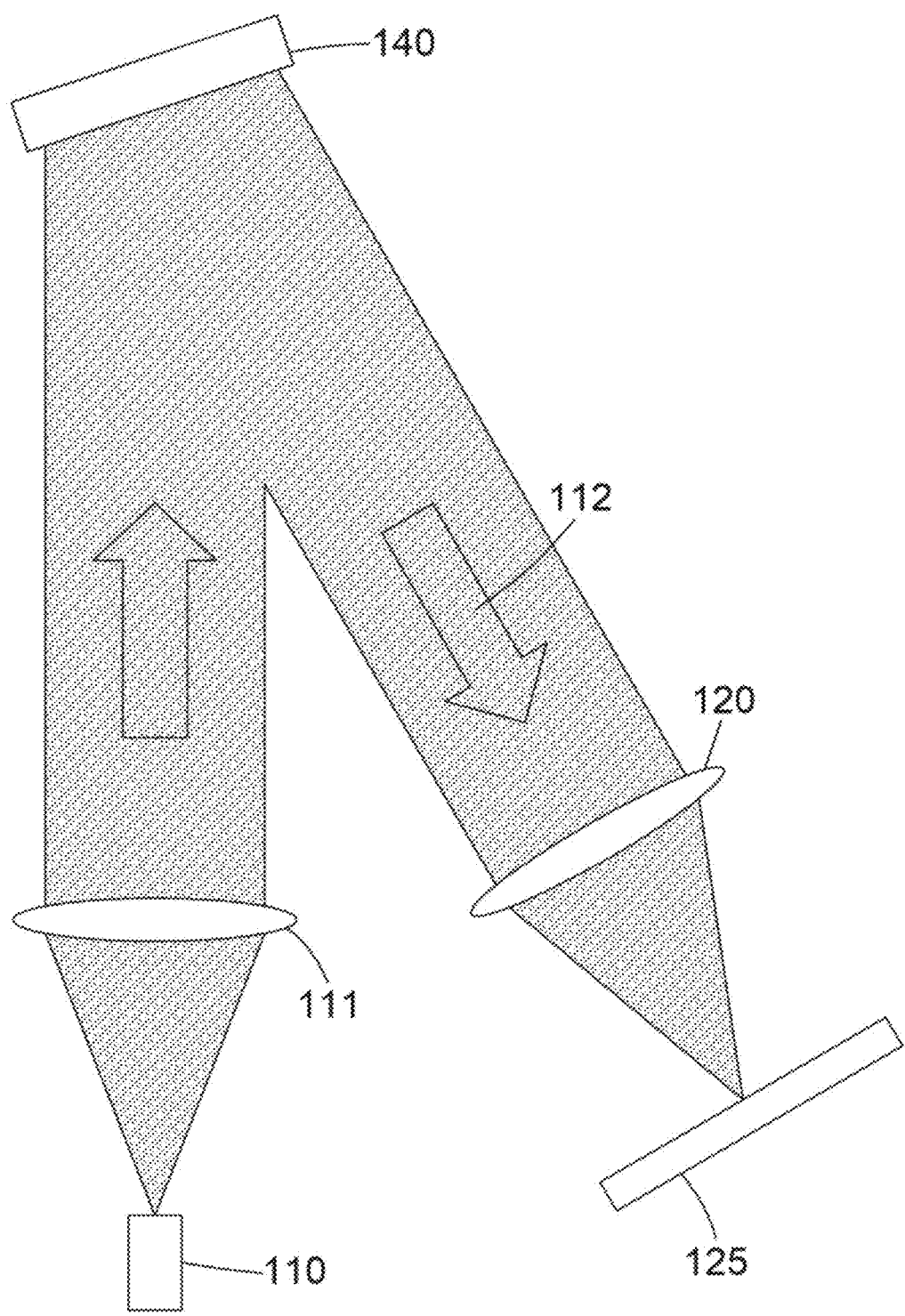
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform In some embodiments of the present disclosure, the lens of the viewer's eye performs the hologram to image transformation.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms. Embodiments relate to Fourier holography and Gerchberg-Saxton type algorithms by way of example only. The present disclosure is equally applicable to Fresnel holography and Fresnel holograms which may be calculated by a similar method. In some embodiments, the hologram is a phase or phase-only hologram. However, the present disclosure is also applicable to holograms calculated by other techniques such as those based on point cloud methods.

In some embodiments, the hologram engine is arranged to exclude from the hologram calculation the contribution of light blocked by a limiting aperture of the display system. British patent application 2101666.2, filed 5 Feb. 2021 and incorporated herein by reference, discloses a first hologram calculation method in which eye-tracking and ray tracing are used to identify a sub-area of the display device for calculation of a point cloud hologram which eliminates ghost images. The sub-area of the display device corresponds with the aperture, of the present disclosure, and is used exclude light paths from the hologram calculation. British patent application 2112213.0, filed 26 Aug. 2021 and incorporated herein by reference, discloses a second method based on a modified Gerchberg-Saxton type algorithm which includes steps of light field cropping in accordance with pupils of the optical system during hologram calculation. The cropping of the light field corresponds with the determination of a limiting aperture of the present disclosure. British patent application 2118911.3, filed 23 Dec. 2021 and also incorporated herein by reference, discloses a third method of calculating a hologram which includes a step of determining a region of a so-called extended modulator formed by a hologram replicator. The region of the extended modulator is also an aperture in accordance with this disclosure.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Large Field of View Using Small Display Device

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other examples, the image is a real image formed by holographic reconstruction and the image is projected or relayed to the viewing plane. In these other examples, spatially modulated light of an intermediate holographic reconstruction formed either in free space or on a screen or other light receiving surface between the display device and the viewer, is propagated to the viewer. In both cases, an image is formed by illuminating a diffractive pattern (e.g., hologram or kinoform) displayed on the display device.

The display device comprises pixels. The pixels of the display may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In some embodiments, the (light of a) hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/image formed between the display device and the viewer. It is sometimes said that, in these embodiments, the lens of the eye performs a hologram-to-image conversion or transform. The projection system, or light engine, may be configured so that the viewer effectively looks directly at the display device.

Reference is made herein to a "light field" which is a "complex light field". The term "light field" merely indicates a pattern of light having a finite size in at least two orthogonal spatial directions, e.g. x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g., 1 metre. And the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays that are propagated from the display device that can successfully propagate through an eye's pupil to form an image. The display device is generally (in relative terms) small and the projection distance is (in relative terms) large. In some embodiments, the projection distance is at least one—such as, at least two—orders of magnitude greater than the diameter, or width, of the entrance pupil and/or aperture of the display device (i.e., size of the array of pixels).

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye box) is the area in which a viewer's eyes can perceive the image. The present disclosure encompasses non-infinite virtual image distances—that is, near-field virtual images.

Conventionally, a two-dimensional pupil expander comprises one or more one-dimensional optical waveguides each formed using a pair of opposing reflective surfaces, in which the output light from a surface forms a viewing window or eye-box. Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

The display device may have an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments—described only by way of example of a diffracted or holographic light field in accordance with this disclosure—a hologram is configured to route light into a plurality of channels, each channel corresponding to a different part (i.e. sub-area) of an image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram may also be a point cloud hologram. The hologram is described herein as routing light into a plurality of hologram channels to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically and uniquely, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels.

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram. Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

The system can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

In accordance with the present disclosure, pupil expansion is provided for diffracted or diffractive light, which may comprise diverging ray bundles. The diffracted light field may be defined by a "light cone". Thus, the size of the diffracted light field (as defined on a two-dimensional plane) increases with propagation distance from the corresponding diffractive structure (i.e. display device). It can be said that the pupil expander/s replicate the hologram or form at least one replica of the hologram, to convey that the light delivered to the viewer is spatially modulated in accordance with a hologram.

In some embodiments, two one-dimensional waveguide pupil expanders are provided, each one-dimensional waveguide pupil expander being arranged to effectively increase the size of the exit pupil of the system by forming a plurality of replicas or copies of the exit pupil (or light of the exit pupil) of the spatial light modulator. The exit pupil may be understood to be the physical area from which light is output by the system. It may also be said that each waveguide pupil expander is arranged to expand the size of the exit pupil of the system. It may also be said that each waveguide pupil expander is arranged to expand/increase the size of the eye box within which a viewer's eye can be located, in order to see/receive light that is output by the system.

Light Channeling

The hologram formed in accordance with some embodiments, angularly-divides the image content to provide a plurality of hologram channels which may have a cross-sectional shape defined by an aperture of the optical system. The hologram is calculated to provide this channeling of the diffracted light field. In some embodiments, this is achieved during hologram calculation by considering an aperture (virtual or real) of the optical system, as described above.

Figure 2:
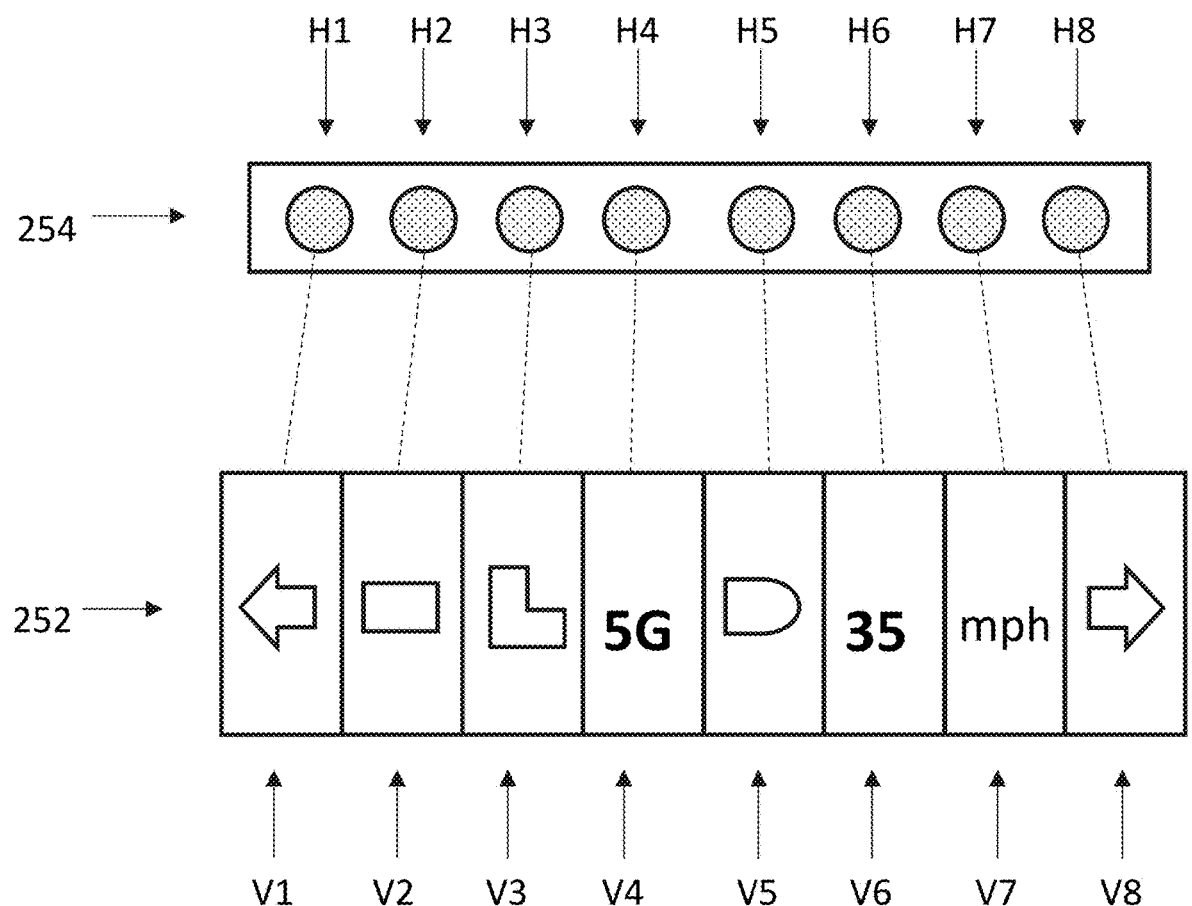
FIG. 2 shows an image for projection comprising eight image areas/components, V1 to V8, and cross-sections of the corresponding hologram channels, H1-H8.
Figure 3:
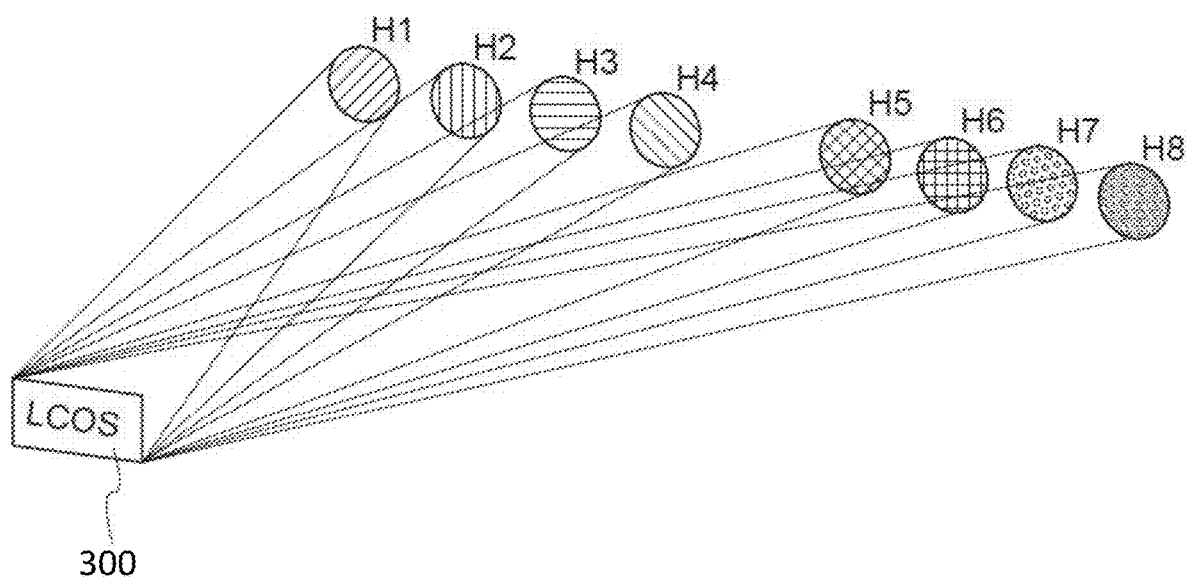
FIG. 3 shows a hologram displayed on an LCOS that directs light into a plurality of discrete areas.

FIGS. 2 and 3 show an example of this type of hologram that may be used in conjunction with a pupil expander as disclosed herein. However, this example should not be regarded as limiting with respect to the present disclosure.

FIG. 2 shows an image 252 for projection comprising eight image areas/components, V1 to V8. FIG. 2 shows eight image components by way of example only and the image 252 may be divided into any number of components. FIG. 2 also shows an encoded light pattern 254 (i.e., hologram) that can reconstruct the image 252—e.g., when transformed by the lens of a suitable viewing system. The encoded light pattern 254 comprises first to eighth sub-holograms or components, H1 to H8, corresponding to the first to eighth image components/areas, V1 to V8. FIG. 2 further shows how a hologram may decompose the image content by angle. The hologram may therefore be characterised by the channeling of light that it performs. This is illustrated in FIG. 3. Specifically, the hologram in this example directs light into a plurality of discrete areas. The discrete areas are discs in the example shown but other shapes are envisaged. The size and shape of the optimum disc may, after propagation through the waveguide, be related to the size and shape of an aperture of the optical system such as the entrance pupil of the viewing system.

Figure 4:
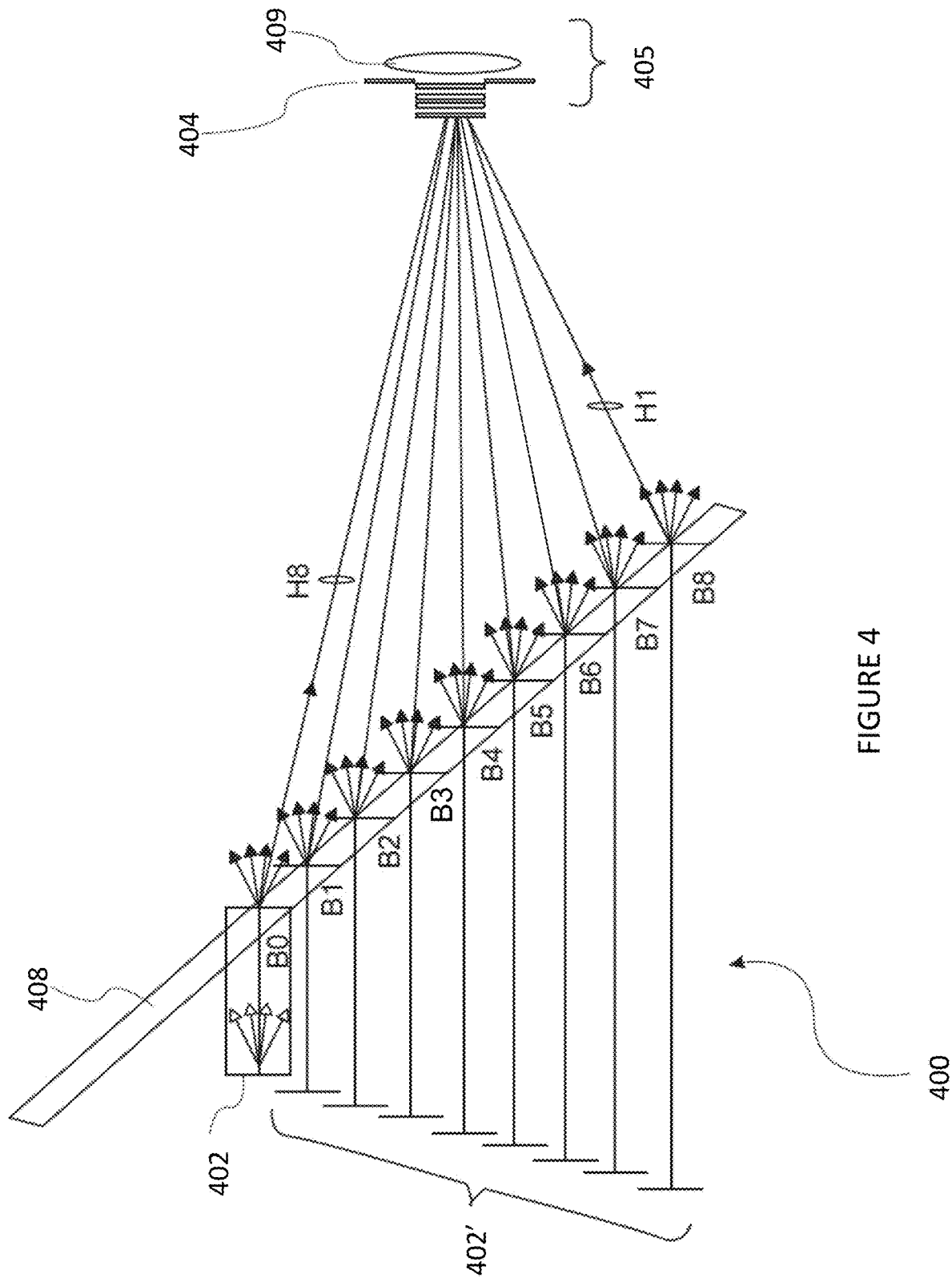
FIG. 4 shows a system, including a display device that displays a hologram that has been calculated as illustrated in FIGS. 2 and 3.

FIG. 4 shows a system 400, including a display device that displays a hologram that has been calculated as illustrated in FIGS. 2 and 3.

The system 400 comprises a display device, which in this arrangement comprises an LCOS 402. The LCOS 402 is arranged to display a modulation pattern (or 'diffractive pattern') comprising the hologram and to project light that has been holographically encoded towards an eye 405 that comprises a pupil that acts as an aperture 404, a lens 409, and a retina (not shown) that acts as a viewing plane. There is a light source (not shown) arranged to illuminate the LCOS 402. The lens 409 of the eye 405 performs a hologram-to-image transformation. The light source may be of any suitable type. For example, it may comprise a laser light source.

The viewing system 400 further comprises a waveguide 408 positioned between the LCOS 402 and the eye 405. The presence of the waveguide 408 enables all angular content from the LCOS 402 to be received by the eye, even at the relatively large projection distance shown. This is because the waveguide 508 acts as a pupil expander, in a manner that is well known and so is described only briefly herein.

In brief, the waveguide 408 shown in FIG. 4 comprises a substantially elongate formation. In this example, the waveguide 408 comprises an optical slab of refractive material, but other types of waveguide are also well known and may be used. The waveguide 408 is located so as to intersect the light cone (i.e., the diffracted light field) that is projected from the LCOS 402, for example at an oblique angle. In this example, the size, location, and position of the waveguide 408 are configured to ensure that light from each of the eight ray bundles, within the light cone, enters the waveguide 408. Light from the light cone enters the waveguide 408 via its first planar surface (located nearest the LCOS 402) and is guided at least partially along the length of the waveguide 408, before being emitted via its second planar surface, substantially opposite the first surface (located nearest the eye). As will be well understood, the second planar surface is partially reflective, partially transmissive. In other words, when each ray of light travels within the waveguide 408 from the first planar surface and hits the second planar surface, some of the light will be transmitted out of the waveguide 408 and some will be reflected by the second planar surface, back towards the first planar surface. The first planar surface is reflective, such that all light that hits it, from within the waveguide 408, will be reflected back towards the second planar surface. Therefore, some of the light may simply be refracted between the two planar surfaces of the waveguide 408 before being transmitted, whilst other light may be reflected, and thus may undergo one or more reflections, (or 'bounces') between the planar surfaces of the waveguide 408, before being transmitted.

FIG. 4 shows a total of nine "bounce" points, B0 to B8, along the length of the waveguide 408. Although light relating to all points of the image (V1-V8) as shown in FIG. 2 is transmitted out of the waveguide at each "bounce" from the second planar surface of the waveguide 408, only the light from one angular part of the image (e.g. light of one of V1 to V8) has a trajectory that enables it to reach the eye 405, from each respective "bounce" point, B0 to B8. Moreover, light from a different angular part of the image, V1 to V8, reaches the eye 405 from each respective "bounce" point. Therefore, each angular channel of encoded light reaches the eye only once, from the waveguide 408, in the example of FIG. 4.

The waveguide 408 forms a plurality of replicas of the hologram, at the respective "bounce" points B1 to B8 along its length, corresponding to the direction of pupil expansion. As shown in FIG. 5, the plurality of replicas may be extrapolated back, in a straight line, to a corresponding plurality of replica or virtual display devices 402'. This process corresponds to the step of "unfolding" an optical path within the waveguide, so that a light ray of a replica is extrapolated back to a "virtual surface" without internal reflection within the waveguide. Thus, the light of the expanded exit pupil may be considered to originate from a virtual surface (also called an "extended modulator" herein) comprising the display device 402 and the replica display devices 402'.

Although virtual images, which require the eye to transform received modulated light in order to form a perceived image, have generally been discussed herein, the methods and arrangements described herein can be applied to real images.

Two-Dimensional Pupil Expansion

Whilst the arrangement shown in FIG. 4 includes a single waveguide that provides pupil expansion in one dimension, pupil expansion can be provided in more than one dimension, for example in two dimensions. Moreover, whilst the example in FIG. 4 uses a hologram that has been calculated to create channels of light, each corresponding to a different portion of an image, the present disclosure and the systems that are described herebelow are not limited to such a hologram type.

Figure 5A:
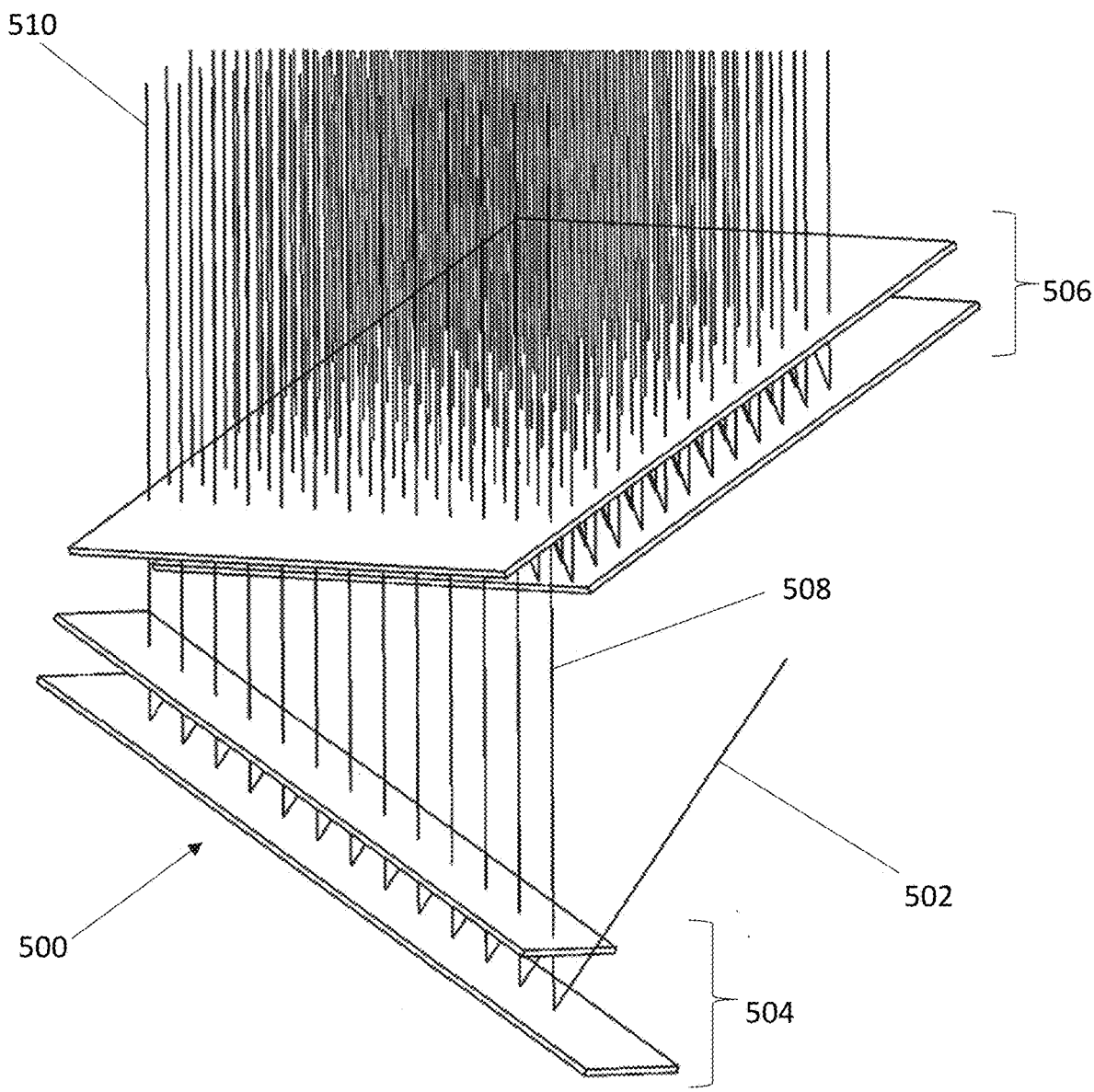
FIG. 5A shows a perspective view of a first example two-dimensional pupil expander comprising two replicators each comprising pairs of stacked surfaces.

FIG. 5A shows a perspective view of a system 500 comprising two replicators, 504, 506 arranged for expanding a light beam 502 in two dimensions.

In the system 500 of FIG. 5A, the first replicator 504 comprises a first pair of surfaces, stacked parallel to one another, and arranged to provide replication—or, pupil expansion—in a similar manner to the waveguide 408 of FIG. 4. The first pair of surfaces are similarly (in some cases, identically) sized and shaped to one another and are substantially elongate in one direction. The collimated light beam 502 is directed towards an input on the first replicator 504. Due to a process of internal reflection between the two surfaces, and partial transmission of light from each of a plurality of output points on one of the surfaces (the upper surface, as shown in FIG. 5A), which will be familiar to the skilled reader, light of the light beam 502 is replicated in a first direction, along the length of the first replicator 504. Thus, a first plurality of replica light beams 508 is emitted from the first replicator 504, towards the second replicator 506.

The second replicator 506 comprises a second pair of surfaces stacked parallel to one another, arranged to receive each of the collimated light beams of the first plurality of light beams 508 and further arranged to provide replication—or, pupil expansion—by expanding each of those light beams in a second direction, substantially orthogonal to the first direction. The first pair of surfaces are similarly (in some cases, identically) sized and shaped to one another and are substantially rectangular. The rectangular shape is implemented for the second replicator in order for it to have length along the first direction, in order to receive the first plurality of light beams 508, and to have length along the second, orthogonal direction, in order to provide replication in that second direction. Due to a process of internal reflection between the two surfaces, and partial transmission of light from each of a plurality of output points on one of the surfaces (the upper surface, as shown in FIG. 5A), light of each light beam within the first plurality of light beams 508 is replicated in the second direction. Thus, a second plurality of light beams 510 is emitted from the second replicator 506, wherein the second plurality of light beams 510 comprises replicas of the input light beam 502 along each of the first direction and the second direction. Thus, the second plurality of light beams 510 may be regarded as comprising a two-dimensional grid, or array, of replica light beams.

Thus, it can be said that the first and second replicators 504, 505 of FIG. 5A combine to provide a two-dimensional replicator (or, "two-dimensional pupil expander"). Thus, the replica light beams 510 may be emitted along an optical path to an expanded eye-box of a display system, such as a head-up display.

In the system of FIG. 5A, the first replicator 504 is a waveguide comprising a pair of elongate rectilinear reflective surfaces, stacked parallel to one another, and, similarly, the second replicator 504 is a waveguide comprising a pair of rectangular reflective surfaces, stacked parallel to one another. In other systems, the first replicator may be a solid elongate rectilinear waveguide and the second replicator may be a solid planar rectangular shaped waveguide, wherein each waveguide comprises an optically transparent solid material such as glass. In this case, the pair of parallel reflective surfaces are formed by a pair of opposed major sidewalls optionally comprising respective reflective and reflective-transmissive surface coatings, familiar to the skilled reader.

Figure 5B:
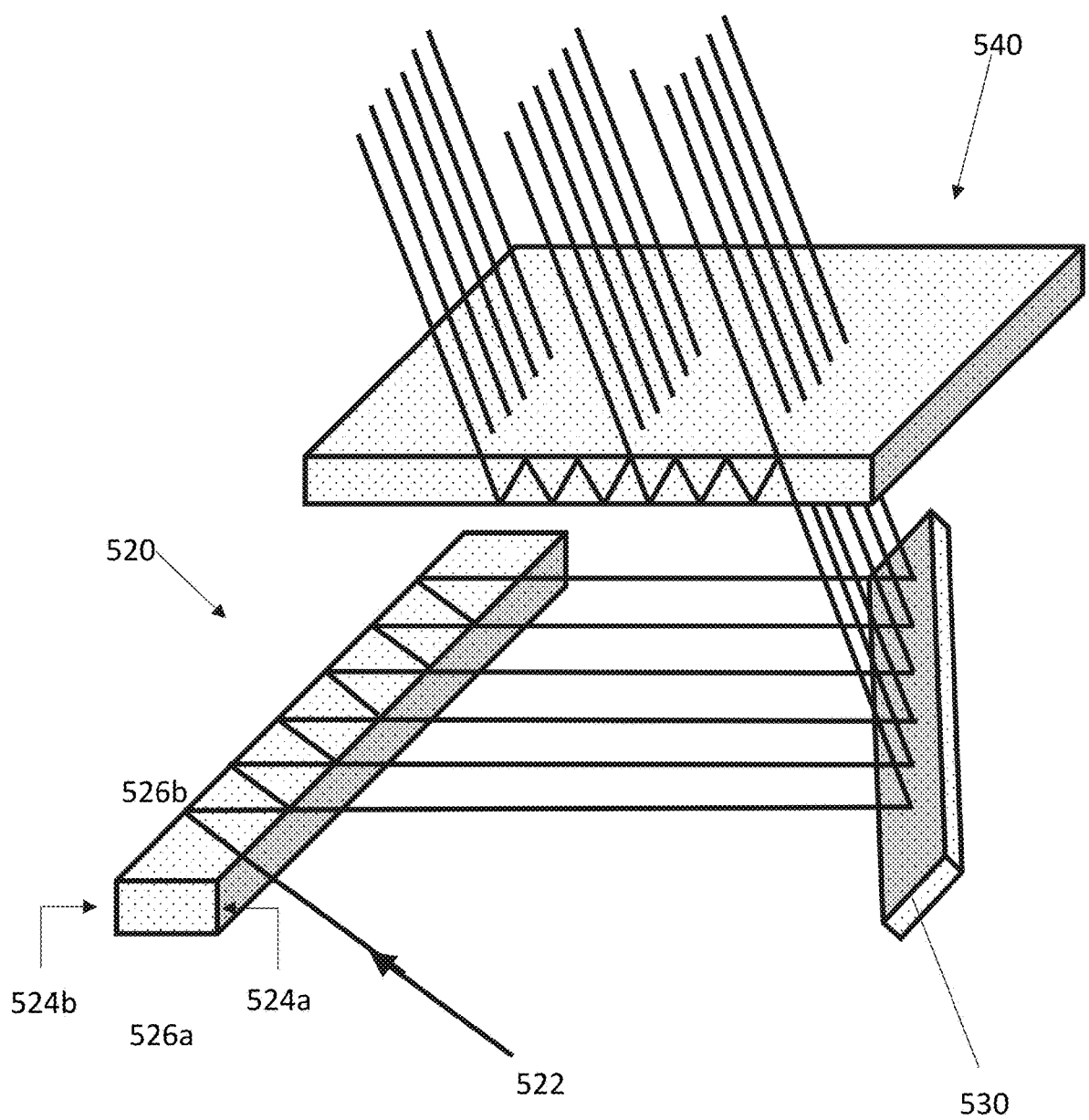
FIG. 5B shows a perspective view of a first example two-dimensional pupil expander comprising two replicators each in the form of a solid waveguide.

FIG. 5B shows a perspective view of a system 500 comprising two replicators, 520, 540 arranged for replicating a light beam 522 in two dimensions, in which the first replicator is a solid elongated waveguide 520 and the second replicator is a solid planar waveguide 540.

In the system of FIG. 5B, the first replicator/waveguide 520 is arranged so that its pair of elongate parallel reflective surfaces 524a, 524b are perpendicular to the plane of the second replicator/waveguide 540. Accordingly, the system comprises an optical coupler arranged to couple light from an output port of first replicator 520 into an input port of the second replicator 540. In the illustrated arrangement, the optical coupler is a planar/fold mirror 530 arranged to fold or turn the optical path of light to achieve the required optical coupling from the first replicator to the second replicator. As shown in FIG. 5B, the mirror 530 is arranged to receive light—comprising a one-dimensional array of replicas extending in the first dimension—from the output port/reflective-transmissive surface 524a of the first replicator/waveguide 520. The mirror 530 is tilted so as to redirect the received light onto an optical path to an input port in the (fully) reflective surface of second replicator 540 at an angle to provide waveguiding and replica formation, along its length in the second dimension. It will be appreciated that the mirror 530 is one example of an optical element that can redirect the light in the manner shown, and that one or more other elements may be used instead, to perform this task.

In the illustrated arrangement, the (partially) reflective-transmissive surface 524a of the first replicator 520 is adjacent the input port of the first replicator/waveguide 520 that receives input beam 522 at an angle to provide waveguiding and replica formation, along its length in the first dimension. Thus, the input port of first replicator/waveguide 520 is positioned at an input end thereof at the same surface as the reflective-transmissive surface 524a. The skilled reader will understand that the input port of the first replicator/waveguide 520 may be at any other suitable position.

Accordingly, the arrangement of FIG. 5B enables the first replicator 520 and the mirror 530 to be provided as part of a first relatively thin layer in a plane in the first and third dimensions (illustrated as an x-z plane). In particular, the size or "height" of a first planar layer—in which the first replicator 520 is located—in the second dimension (illustrated as the y dimension) is reduced. The mirror 530 is configured to direct the light away from a first layer/plane, in which the first replicator 520 is located (i.e. the "first planar layer"), and direct it towards a second layer/plane, located above and substantially parallel to the first layer/plane, in which the second replicator 540 is located (i.e. a "second planar layer"). Thus, the overall size or "height" of the system—comprising the first and second replicators 520, 540 and the mirror 530 located in the stacked first and second planar layers in the first and third dimensions (illustrated as an x-z plane)—in the second dimension (illustrated as the y dimension) is compact. The skilled reader will understand that many variations of the arrangement of FIG. 5B for implementing the present disclosure are possible and contemplated.

The image projector may be arranged to project a diverging or diffracted light field. In some embodiments, the light field is encoded with a hologram. In some embodiments, the diffracted light field comprises diverging ray bundles. In some embodiments, the image formed by the diffracted light field is a virtual image.

In some embodiments, the first pair of parallel/complementary surfaces are elongate or elongated surfaces, being relatively long along a first dimension and relatively short along a second dimension, for example being relatively short along each of two other dimensions, with each dimension being substantially orthogonal to each of the respective others. The process of reflection/transmission of the light between/from the first pair of parallel surfaces is arranged to cause the light to propagate within the first waveguide pupil expander, with the general direction of light propagation being in the direction along which the first waveguide pupil expander is relatively long (i.e., in its "elongate" direction).

There is disclosed herein a system that forms an image using diffracted light and provides an eye-box size and field of view suitable for real-world application—e.g. in the automotive industry by way of a head-up display. The diffracted light is light forming a holographic reconstruction of the image from a diffractive structure—e.g. hologram such as a Fourier or Fresnel hologram. The use diffraction and a diffractive structure necessitates a display device with a high density of very small pixels (e.g. 1 micrometer)—which, in practice, means a small display device (e.g. 1 cm). The inventors have addressed a problem of how to provide 2D pupil expansion with a diffracted light field e.g. diffracted light comprising diverging (not collimated) ray bundles.

In some embodiments, the display system comprises a display device—such as a pixelated display device, for example a spatial light modulator (SLM) or Liquid Crystal on Silicon (LCoS) SLM—which is arranged to provide or form the diffracted or diverging light. In such aspects, the aperture of the spatial light modulator (SLM) is a limiting aperture of the system. That is, the aperture of the spatial light modulator—more specifically, the size of the area delimiting the array of light modulating pixels comprised within the SLM—determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extend by the use of at least one pupil expander.

The diffracted or diverging light field may be said to have "a light field size", defined in a direction substantially orthogonal to a propagation direction of the light field. Because the light is diffracted/diverging, the light field size increases with propagation distance.

In some embodiments, the diffracted light field is spatially-modulated in accordance with a hologram. In other words, in such aspects, the diffractive light field comprises a "holographic light field". The hologram may be displayed on a pixelated display device. The hologram may be a computer-generated hologram (CGH). It may be a Fourier hologram or a Fresnel hologram or a point-cloud hologram or any other suitable type of hologram. The hologram may, optionally, be calculated so as to form channels of hologram light, with each channel corresponding to a different respective portion of an image that is intended to be viewed (or perceived, if it is a virtual image) by the viewer. The pixelated display device may be configured to display a plurality of different holograms, in succession or in sequence. Each of the aspects and embodiments disclosed herein may be applied to the display of multiple holograms.

The output port of the first waveguide pupil expander may be coupled to an input port of a second waveguide pupil expander. The second waveguide pupil expander may be arranged to guide the diffracted light field—including some of, preferably most of, preferably all of, the replicas of the light field that are output by the first waveguide pupil expander—from its input port to a respective output port by internal reflection between a third pair of parallel surfaces of the second waveguide pupil expander.

The first waveguide pupil expander may be arranged to provide pupil expansion, or replication, in a first direction and the second waveguide pupil expander may be arranged to provide pupil expansion, or replication, in a second, different direction. The second direction may be substantially orthogonal to the first direction. The second waveguide pupil expander may be arranged to preserve the pupil expansion that the first waveguide pupil expander has provided in the first direction and to expand (or, replicate) some of, preferably most of, preferably all of, the replicas that it receives from the first waveguide pupil expander in the second, different direction. The second waveguide pupil expander may be arranged to receive the light field directly or indirectly from the first waveguide pupil expander. One or more other elements may be provided along the propagation path of the light field between the first and second waveguide pupil expanders.

The first waveguide pupil expander may be substantially elongated and the second waveguide pupil expander may be substantially planar. The elongated shape of the first waveguide pupil expander may be defined by a length along a first dimension. The planar, or rectangular, shape of the second waveguide pupil expander may be defined by a length along a first dimension and a width, or breadth, along a second dimension substantially orthogonal to the first dimension. A size, or length, of the first waveguide pupil expander along its first dimension make correspond to the length or width of the second waveguide pupil expander along its first or second dimension, respectively. A first surface of the pair of parallel surfaces of the second waveguide pupil expander, which comprises its input port, may be shaped, sized, and/or located so as to correspond to an area defined by the output port on the first surface of the pair of parallel surfaces on the first waveguide pupil expander, such that the second waveguide pupil expander is arranged to receive each of the replicas output by the first waveguide pupil expander.

The first and second waveguide pupil expander may collectively provide pupil expansion in a first direction and in a second direction perpendicular to the first direction, optionally, wherein a plane containing the first and second directions is substantially parallel to a plane of the second waveguide pupil expander. In other words, the first and second dimensions that respectively define the length and breadth of the second waveguide pupil expander may be parallel to the first and second directions, respectively, (or to the second and first directions, respectively) in which the waveguide pupil expanders provide pupil expansion. The combination of the first waveguide pupil expander and the second waveguide pupil expander may be generally referred to as being a "pupil expander".

It may be said that the expansion/replication provided by the first and second waveguide expanders has the effect of expanding an exit pupil of the display system in each of two directions. An area defined by the expanded exit pupil may, in turn define an expanded eye-box area, from which the viewer can receive light of the input diffracted or diverging light field. The eye-box area may be said to be located on, or to define, a viewing plane.

The two directions in which the exit pupil is expanded may be coplanar with, or parallel to, the first and second directions in which the first and second waveguide pupil expanders provide replication/expansion. Alternatively, in arrangements that comprise other elements such as an optical combiner, for example the windscreen (or, windshield) of a vehicle, the exit pupil may be regarded as being an exit pupil from that other element, such as from the windscreen. In such arrangements, the exit pupil may be non-coplanar and non-parallel with the first and second directions in which the first and second waveguide pupil expanders provide replication/expansion. For example, the exit pupil may be substantially perpendicular to the first and second directions in which the first and second waveguide pupil expanders provide replication/expansion.

The viewing plane, and/or the eye-box area, may be non-coplanar or non-parallel to the first and second directions in which the first and second waveguide pupil expanders provide replication/expansion. For example, a viewing plane may be substantially perpendicular to the first and second directions in which the first and second waveguide pupil expanders provide replication/expansion.

In order to provide suitable launch conditions to achieve internal reflection within the first and second waveguide pupil expanders, an elongate dimension of the first waveguide pupil expander may be tilted relative to the first and second dimensions of the second waveguide pupil expander.

Combiner Shape Compensation

An advantage of projecting a hologram to the eye-box is that optical compensation can be encoded in the hologram (see, for example, European patent 2936252 incorporated herein by herein). The present disclosure is compatible with holograms that compensate for the complex curvature of an optical combiner used as part of the projection system. In some embodiments, the optical combiner is the windscreen of a vehicle. Full details of this approach are provided in European patent 2936252 and are not repeated here because the detailed features of those systems and methods are not essential to the new teaching of this disclosure herein and are merely exemplary of configurations that benefit from the teachings of the present disclosure.

Control Device

The present disclosure is also compatible with optical configurations that include a control device (e.g. light shuttering device) to control the delivery of light from a light channeling hologram to the viewer. The holographic projector may further comprise a control device arranged to control the delivery of angular channels to the eye-box position. British patent application 2108456.1, filed 14 Jun. 2021 and incorporated herein by reference, discloses the at least one waveguide pupil expander and control device. The reader will understand from at least this prior disclosure that the optical configuration of the control device is fundamentally based upon the eye-box position of the user and is compatible with any hologram calculation method that achieves the light channeling described herein. It may be said that the control device is a light shuttering or aperturing device. The light shuttering device may comprise a 1D array of apertures or windows, wherein each aperture or window independently switchable between a light transmissive and a light non-transmissive state in order to control the deliver of hologram light channels, and their replicas, to the eye-box. Each aperture or window may comprise a plurality of liquid crystal cells or pixels.

Improved Driver

A spatial light modulator (SLM), such as Liquid crystal on Silicon (LCOS), may have a tendency to experience a phenomenon that may be referred to as image sticking, image burn-in, or ghosting. Image burn-in typically presents itself by way of the image displayed on the SLM persisting even after the driving signal is removed. Image burn-in can also be exacerbated by an image being displayed for a long period of time and at high temperatures. Ultimately, if image burn-in is not reduced or mitigated, the ability of the SLM to accurately reproduce the intended hologram degrades over time which degrades the contrast and resolution of the overall holographic display system.

In normal operations, an SLM is driven, e.g. by a driver, by applying a respective display/drive voltage to each pixel of the SLM. In an example, the SLM is driven to display a sequence of holograms of a picture. Each pixel to delay the phase of a portion of an incident wavefront propagating through that pixel. Thus, the incident wavefront may be spatially modulated in accordance with the hologram to form a holographic wavefront which may be relayed to a viewing system whereby holographic reconstructions of the pictures are formed.

In some operations, the SLM may be driven to display a permanent/static feature in addition to the (sequence of)

holograms. To display the permanent/static features, an appropriate phase delay may be applied to the pixels of the SLM. This may be in addition to the phase delay applied to display the hologram such that SLM displays a superposition of the phase delay associated with the hologram and the phase delay associated with any or each permanent/static feature. The phase delay associated with any or each permanent/static feature may be substantially constant, while the phase delay associated with the (changing) hologram changes. Since the permanent/static features do not change significantly over time, the long term average phase delay/grey level of each pixel may tend to resemble the permanent features. Thus, these permanent features can result in an imbalance to the SLM after a prolonged periods of use. Examples of the permanent features include a Fresnel lens (for magnification) or a grating lens (for translational shifts).

The term "grey level" or "phase delay" of a particular pixel is used to refer to the amount of phase retardation provided by that pixel to light interacting with that pixel, i.e. the difference, in phase, between a wavefront entering the pixel and that wavefront exiting the pixel (after entering and propagating through the pixel).

The present inventors have found a surprising way to reduce or mitigate image burn-in is by applying a series of phase offsets to the pixels displaying the hologram. Since the static images displayed on the SLM work based on relative phase, the addition of this phase offset does not influence the holographic picture seen by a viewer. The phase offsets may comprise positive values, or negative values, or zero.

For example, an additional uniform rotating phase mask can be applied to the SLM displaying the hologram. The additional uniform rotating phase mask comprises on 1 frame add GL (Grey Level) 1 to all pixels and on the next frame add GL2 to all pixels, etc. The additional uniform rotating phase mask cycles through all available grey levels and repeats. The constantly changing phase mask will average out any static content on the LCOS over all grey levels evenly, thus reducing or mitigating the risk of any image burn-in. While this example contains adding GLs, the additional uniform rotating phase mask may also subtracting or reducing GLs instead. The term "Grey Level" used above refers to a specific value of phase delay available to a particular SLM, e.g., a phase-only modulator. As such, the numeral suffix refers to how many multiples of that specific value of phase delay, e.g. GL1 may be a phase delay of $\pi/6$ and GL2 may be a phase delay of $\pi/3$ to a maximum of GL12 which is a phase delay of $2\pi$.

Figure 6:
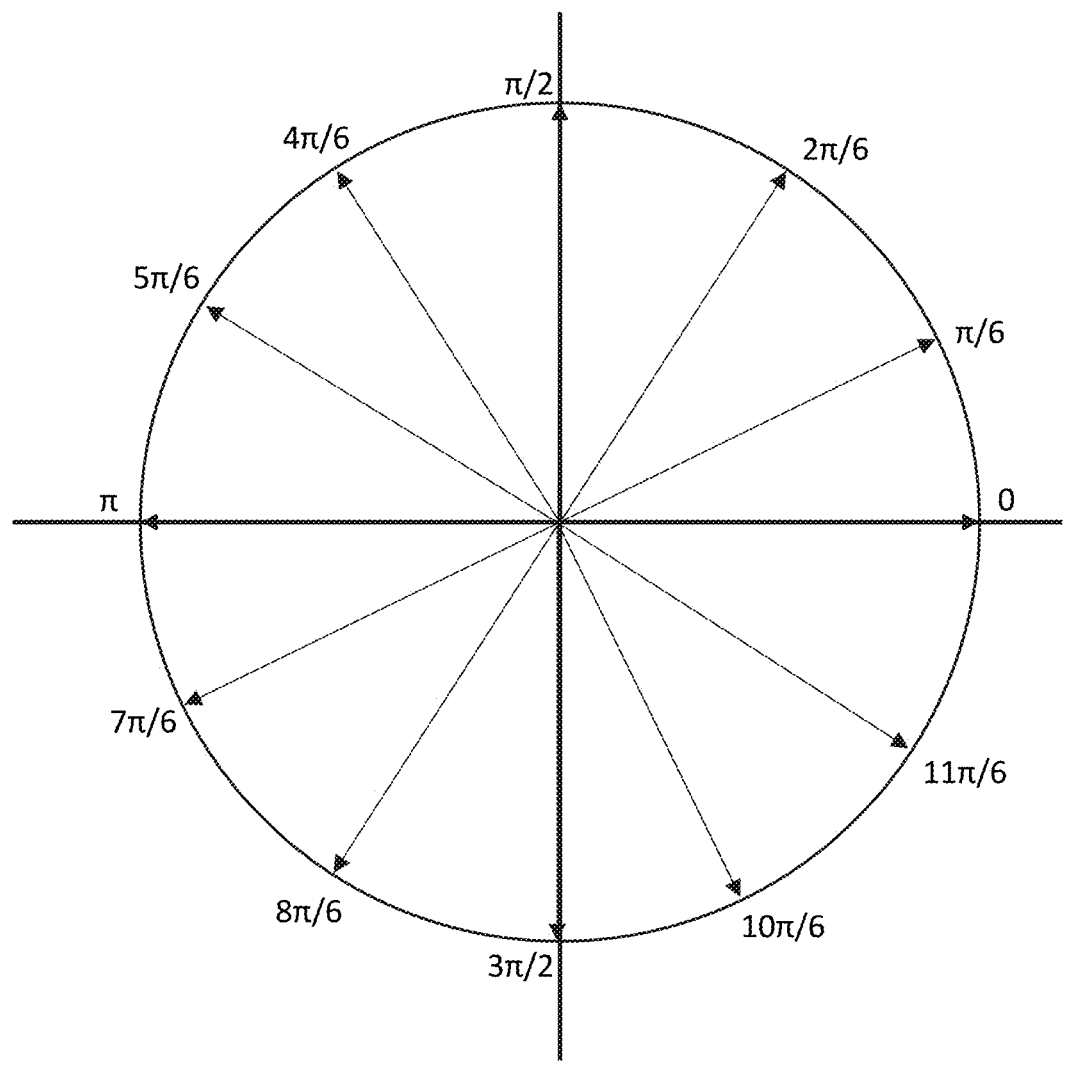
FIG. 6 shows a series of phase offsets that can be applied to the pixels of the spatial light modulator.

FIG. 6 depicts a non-limiting example of a series of phase offsets that can be applied to the pixels of the SLM. The phase offset values may cycle through the values shown in FIG. 6 (i.e. between 0 and $2\pi$ radians) in intervals of $\pi/6$ radians. In other words, the value of the phase offset in a particular instance is $\pi/6$ greater than the value of the previously applied phase offset. For example, the first application may be $\pi/6$, the second application may be $\pi/3$, third application may be $\pi/2$, . . . so on until $2\pi$.

In embodiments, the phase interval may be a value different from $\pi/6$. In other embodiments, the intervals may be any fraction of 7f, e.g. $\pi/8$, $\pi/10$, $\pi/3$, or $\pi/2$. In other embodiments, the phase offset values are not evenly distributed between 0 and $2\pi$. In other embodiments, there may be more or less values of phase offsets. In other embodiments, the cycling of phase values/grey levels can be between about 1 Hz and 60 Hz. In other words, the phase offset may be applied at a rate between 1 Hz and 60 Hz.

Moreover, the phase offsets/GLs do not need to be applied in ascending or descending order. For example, a random number generator could be used to select a particular phase offset value. The phase offset values themselves may also be randomly generated. The phase offset values may also be algorithmically generated to occur at regular intervals. In some embodiments, the phase offsets/GLs may comprise positive values, or negative values, or zero.

Figure 7:
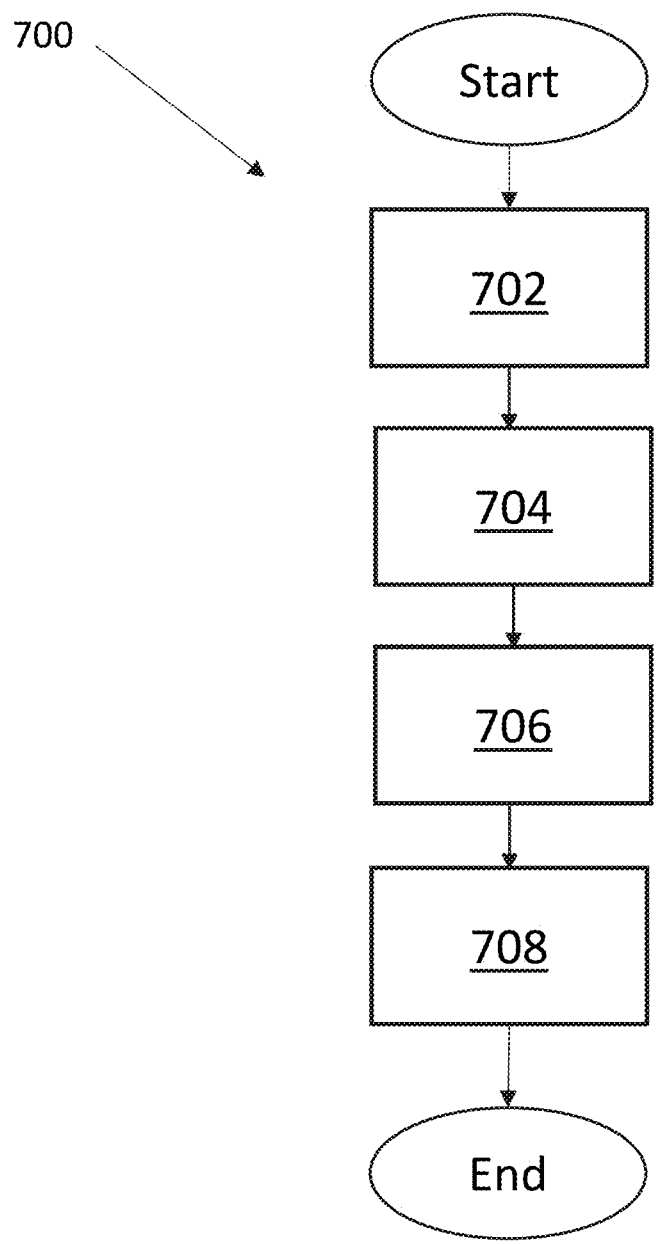

FIG. 7 depicts a method of driving a spatial light modulator. The method 700 comprises receiving 702, by a driver, a hologram of a picture. The method 700 further comprises driving 704, by the driver, the SLM to display the hologram on a contiguous group of pixels of the plurality of pixels. The driving step may comprise applying a respective display voltage to the group of pixels which causes the group of pixels to delay the phase of any wavefront propagating through the group of pixels. This phase delay corresponds to the grey level of the pixel. In this way, the driver drives the SLM to display the hologram on the plurality of [x x y] pixels of the SLM.

The method 700 further comprises applying 706, by the driver, a series of phase offsets to the SLM displaying the hologram. Each phase offset of the series of phase offsets is applied to each pixel of the group of pixels for a respective predetermined period of time. For example, this may be implemented by applying an additional voltage offset on top of the display voltage. To modify the phase delay of each pixel by the same value, a respective voltage offset is needed for each pixel. The respective voltage offsets may not be the same as each other. The respective voltage offsets may comprise positive values, or negative values, or zero.

The modification of the phase delay of each of the group of pixels may result in the (contiguous) group of pixels to display a phase shifted version of the hologram. Since the same phase offset is applied to all the pixels, the phase differences between the pixels are preserved and the function of the hologram remains intact.

The driver may apply a first phase offset by applying a first voltage offset to each pixel of the group of pixels for a first period of time. The first voltage offset may be positive or negative. The driver may, subsequent to the application of the first phase offset, apply a second phase offset by applying a second voltage offset to each pixel of the group of pixels. The driver may apply the second voltage offset for a second period of time. The second voltage offset may be positive or negative. The second voltage offset may be greater or lesser than the first voltage offset. The second period of time may be the same as or different from the first period of time.

Additional Features

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

What is claimed is:

1. A driver for a spatial light modulator comprising a plurality of pixels, wherein the driver is configured to:
   receive a hologram of a picture;
   drive the spatial light modulator to display the hologram on a group of pixels of the plurality of pixels;
   determine, for each pixel of the group of pixels, a respective voltage offset to be applied to the pixel to achieve a particular phase offset of a series of phase offsets; and
   apply the series of phase offsets to the spatial light modulator displaying the hologram, wherein each phase offset of the series of phase offsets is applied to each pixel of the group of pixels for a respective predetermined period of time, and wherein each phase offset applied to the group of pixels causes a phase delay of that group of pixels to be modified by a same value.

2. The driver of claim 1, where the driver is further configured to apply the series of phase offsets by applying the determined voltage offsets to the group of pixels.

3. The driver of claim 1, wherein the respective predetermined periods of time are the same or different from each other.

4. The driver of claim 1, wherein the series of phase offsets comprises a finite series of values that is repeated.

5. The driver of claim 1, wherein the series of phase offsets comprises randomly generated values.

6. The driver of claim 1, wherein an individual phase offset is at least one of (i) between 0 and $2\pi$, (ii) between 0 and $\pi$, or (iii) between 0 and $\pi/2$.

7. The driver of claim 1, wherein a difference between successive phase offset values is at least one of (i) less than $2\pi$, (ii) less than $\pi$, or (iii) less than $\pi/2$.

8. The driver of claim 1, wherein the spatial light modulator comprises a liquid crystal on silicon spatial light modulator.

9. A holographic projector comprising:
   a spatial light modulator comprising a plurality of pixels; and
   a driver configured to: (i) receive a hologram of a picture, (ii) drive the spatial light modulator to display the hologram on a group of pixels of the plurality of pixels, (iii) determine, for each pixel of the group of pixels, a respective voltage offset to be applied to the pixel to achieve a particular phase offset of a series of phase offsets; and (iv) apply the series of phase offsets to the spatial light modulator displaying the hologram, wherein each phase offset of the series of phase offsets is applied to each pixel of the group of pixels for a respective predetermined period of time, and wherein each phase offset applied to the group of pixels causes a phase delay of that group of pixels to be modified by a same value.

10. The holographic projector of claim 9, further comprising:
    a light source arranged to illuminate the spatial light modulator such that a holographic reconstruction of the picture is formed on a replay plane.

11. The holographic projector of claim 9, wherein the driver is further configured to apply the series of phase offsets by applying the determined voltage offsets to the group of pixels, and wherein the respective predetermined periods of time are the same or different from each other.

12. The holographic projector of claim 9, wherein at least one of: (A) an individual phase offset is at least one of (i) between 0 and $2\pi$, (ii) between 0 and $\pi$, or (iii) between 0 and $\pi/2$; and (B) a difference between successive phase offset values is at least one of (i) less than $2\pi$, (ii) less than $\pi$, or (iii) less than $\pi/2$.

13. A method for driving a spatial light modulator comprising a plurality of pixels, wherein the method comprises:
    receiving a hologram of a picture;
    driving the spatial light modulator to display the hologram on a group of pixels of the plurality of pixels;
    determining, for each pixel of the group of pixels, a respective voltage offset to be applied to the pixel to achieve a particular phase offset of a series of phase offsets; and
    applying the series of phase offsets to the spatial light modulator displaying the hologram, wherein each phase offset of the series of phase offsets is applied to each pixel of the group of pixels for a respective predetermined period of time, wherein each phase offset applied to the group of pixels causes phase delays of that group of pixels to be modified by a same value.

14. The method of claim 13, wherein applying the series of phase offsets to the spatial light modulator displaying the hologram comprises applying the determined voltage offsets to the group of pixels.

15. The method of claim 13, wherein the series of phase offsets comprises a finite series of values that is repeated.

16. The method of claim 13, wherein an individual phase offset is at least one of (i) between 0 and $2\pi$, (ii) between 0 and $\pi$, or (iii) between 0 and $\pi/2$.

17. The method of claim 13, wherein a difference between successive phase offsets is at least one of (i) less than $2\pi$, (ii) less than $\pi$, or (iii) less than $\pi/2$.

* * * * *